(12) United States Patent
Matsuoka

(10) Patent No.: US 12,505,736 B2
(45) Date of Patent: Dec. 23, 2025

(54) INFORMATION PROCESSING APPARATUS, VEHICLE, AND SYSTEM

(71) Applicant: TOYOTA JIDOSHA KABUSHIKI KAISHA, Toyota (JP)

(72) Inventor: Katsuhiro Matsuoka, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 168 days.

(21) Appl. No.: 18/410,473

(22) Filed: Jan. 11, 2024

(65) Prior Publication Data

US 2024/0242601 A1    Jul. 18, 2024

(30) Foreign Application Priority Data

Jan. 17, 2023  (JP) ................ 2023-005369

(51) Int. Cl.
*G08G 1/017* (2006.01)
*G08G 1/00* (2006.01)
*G08G 1/052* (2006.01)

(52) U.S. Cl.
CPC ............ *G08G 1/017* (2013.01); *G08G 1/052* (2013.01); *G08G 1/20* (2013.01)

(58) Field of Classification Search
CPC ........... G08G 1/017; G08G 1/052; G08G 1/20
See application file for complete search history.

(56) References Cited

U.S. PATENT DOCUMENTS

| | | | |
|---|---|---|---|
| 10,771,940 B2* | 9/2020 | Onishi | G08G 1/0965 |
| 11,316,691 B2* | 4/2022 | Westland | H04L 9/30 |
| 2018/0225963 A1* | 8/2018 | Kobayashi | G08G 1/09 |
| 2022/0081004 A1* | 3/2022 | Brown | G08G 1/166 |
| 2022/0103789 A1* | 3/2022 | Jung | H04N 5/265 |
| 2022/0204047 A1* | 6/2022 | Mizoguchi | B60W 60/0059 |
| 2022/0212690 A1* | 7/2022 | Zheng | B60K 35/10 |

FOREIGN PATENT DOCUMENTS

JP    2016-128943 A    7/2016

* cited by examiner

*Primary Examiner* — Mohamed Barakat
(74) *Attorney, Agent, or Firm* — Dinsmore & Shohl LLP

(57) ABSTRACT

An information processing apparatus mounted on a first vehicle receives vehicle information including information about a travel state of a second vehicle, from the second vehicle by vehicle-to-vehicle communication. Furthermore, when the vehicle information is received from the second vehicle, the information processing apparatus receives, from a server apparatus, target information that is acquired by the second vehicle and that is transmitted by the second vehicle to the server apparatus.

12 Claims, 5 Drawing Sheets

VEHICLE INFORMATION

| VEHICLE ID | POSITION INFORMATION | SPEED INFORMATION |
|---|---|---|
| V002 | ... | ... |

Fig. 3

TARGET INFORMATION

| VEHICLE ID | TARGET POSITION INFORMATION | TARGET SPEED INFORMATION |
|---|---|---|
| V002 | ... | ... |

Fig. 4

INFORMATION PROCESSING APPARATUS, VEHICLE, AND SYSTEM

CROSS REFERENCE TO THE RELATED APPLICATION

This application claims the benefit of Japanese Patent Application No. 2023-005369, filed on Jan. 17, 2023, which is hereby incorporated by reference herein in its entirety.

BACKGROUND

Technical Field

The present disclosure relates to a vehicle that is capable of performing wireless communication with another vehicle and a server apparatus.

Description of the Related Art

Patent Literature 1 discloses a vehicle peripheral state acquisition apparatus. The vehicle peripheral state acquisition apparatus disclosed in Patent Literature 1 receives, by vehicle-to-vehicle communication, information including position and vehicle speed of another vehicle and a state of obstacles in the periphery of another vehicle. Then, the vehicle peripheral state acquisition apparatus converts the position included in the information received from another vehicle into a relative position relative to an own vehicle, and obtains peripheral information of the own vehicle by combining the information from another vehicle after conversion with a position of the own vehicle and a state of obstacles.

CITATION LIST

Patent Literature

Patent Literature 1: Japanese Patent Application Laid-Open Publication No. 2016-128943

SUMMARY

An object of the present disclosure is to allow a vehicle that is capable of performing wireless communication with another vehicle and a server apparatus to more suitably acquire information that is acquired by another vehicle.

An information processing apparatus according to a first aspect of the present disclosure is an information processing apparatus mounted on a first vehicle, the information processing apparatus including a controller configured to: receive vehicle information including information about a travel state of a second vehicle, from the second vehicle by vehicle-to-vehicle communication, and receive from a server apparatus, when the vehicle information is received from the second vehicle, target information that is acquired by the second vehicle and that is transmitted by the second vehicle to the server apparatus.

A vehicle according to a second aspect of the present disclosure may be configured to: receive vehicle information including information about a travel state of another vehicle, from another vehicle by vehicle-to-vehicle communication; and receive from a server apparatus, when the vehicle information is received from another vehicle, target information that is acquired by another vehicle and that is transmitted by another vehicle to the server apparatus.

A system according to a third aspect of the present disclosure is a system including a first vehicle, a second vehicle, and a server apparatus, where the second vehicle may transmit vehicle information including information about a travel state of the second vehicle, to the first vehicle by vehicle-to-vehicle communication, the second vehicle may transmit target information acquired by the second vehicle, to the server apparatus, and the server apparatus may transmit the target information received from the second vehicle to the first vehicle, when the vehicle information is transmitted by the second vehicle to the first vehicle.

According to the present disclosure, a vehicle that is capable of performing wireless communication with another vehicle and a server apparatus may more suitably acquire information that is acquired by another vehicle.

BRIEF DESCRIPTION OF THE DRAWINGS

FIG. 3 is a diagram illustrating an example of a table structure of vehicle information;

FIG. 4 is a diagram illustrating an example of a table structure of target information;

DESCRIPTION OF THE EMBODIMENTS

Figure 1:
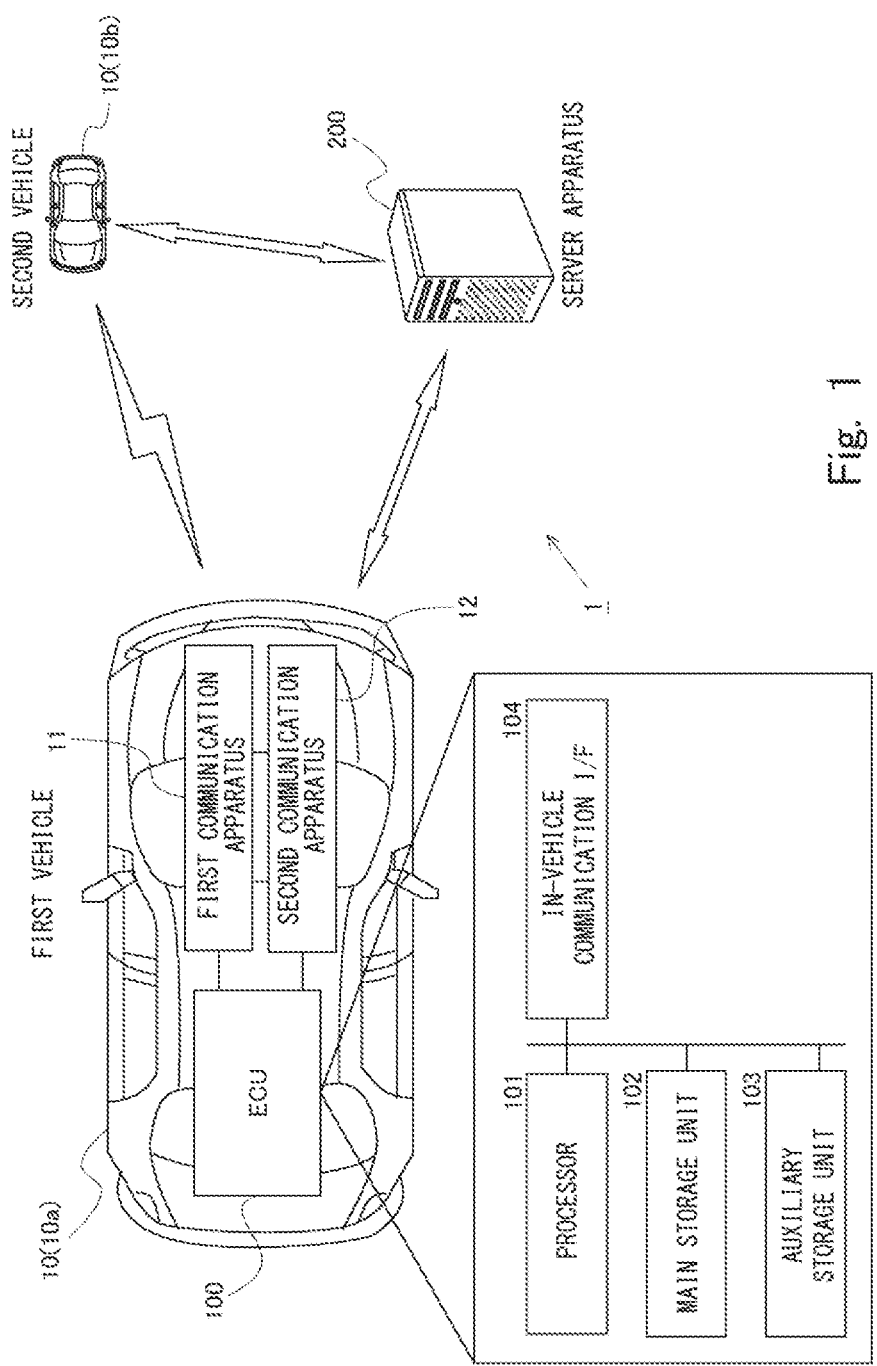
FIG. 1 is a diagram illustrating schematic configurations of a communication system and a vehicle according to an embodiment.

An information processing apparatus according to the present disclosure is an apparatus that is mounted on a vehicle. The information processing apparatus mounted on a first vehicle includes a function of performing vehicle-to-vehicle communication with a second vehicle. The information processing apparatus mounted on the first vehicle also includes a function of performing wireless communication with a server apparatus. The server apparatus that performs wireless communication with the first vehicle also performs wireless communication with the second vehicle.

The information processing apparatus mounted on the first vehicle may receive vehicle information including information about a travel state of the second vehicle, from the second vehicle by vehicle-to-vehicle communication. Various types of control may thus be performed at the first vehicle based on the vehicle information received from the second vehicle. Driving assist control or notification control may be cited as an example of control that is performed at the first vehicle based on the vehicle information received from the second vehicle. The driving assist control may be travel control for the first vehicle that is automatically performed to prevent the first vehicle from colliding into the second vehicle. The notification control may be control of notifying a driver of the first vehicle of presence of the second vehicle.

Moreover, the second vehicle may include a function of acquiring target information. The target information is information about a target that is present within a predetermined detection range of the second vehicle. As the target, a vehicle other than the second vehicle, a person, an animal, or an object may be cited as an example. Furthermore, as the target information, position information or speed information of each target may be cited as an example.

In a state where the vehicle-to-vehicle communication is performed between the first vehicle and the second vehicle, a target corresponding to the target information acquired by the second vehicle may possibly become an obstacle to traveling of the first vehicle. Accordingly, not only the vehicle information about the second vehicle but also the target information that is acquired by the second vehicle may be useful for various types of control performed at the first vehicle.

However, there are cases where it is difficult to transmit the target information acquired by the second vehicle to the first vehicle by the vehicle-to-vehicle communication in the same manner as for the vehicle information about the second vehicle. For example, in the case where the number of targets present in the periphery of the second vehicle is great, quantity of the target information that is acquired by the second vehicle is increased. As a result, it may become difficult to transmit the target information acquired by the second vehicle to the first vehicle by the vehicle-to-vehicle communication.

Accordingly, in the present disclosure, the information processing apparatus mounted on the first vehicle may acquire the target information acquired by the second vehicle, not by the vehicle-to-vehicle communication but by communication through the server apparatus. That is, the second vehicle may transmit the target information acquired by itself to the server apparatus. Moreover, the information processing apparatus mounted on the first vehicle may receive from the server apparatus, the target information transmitted by the second vehicle to the server apparatus, when the vehicle information is received from the second vehicle.

The first vehicle may thus stably acquire the vehicle information about the second vehicle and the target information acquired by the second vehicle. As a result, various types of control may be stably performed at the first vehicle by using both the vehicle information about the second vehicle and the target information acquired by the second vehicle.

Hereinafter, a specific embodiment of the present disclosure will be described with reference to the drawings. Dimensions, materials, shapes, relative positions and the like of structural components described in the present embodiment are not intended to limit the technical scope of the present disclosure unless stated otherwise.

Embodiment (Outline of System)

Schematic configurations of a communication system and a vehicle according to a present embodiment will be described with reference to FIG. 1. FIG. 1 is a diagram illustrating schematic configurations of the communication system and the vehicle according to the present embodiment. In a communication system 1, wireless communication is performed between each of a plurality of vehicles 10 and a server apparatus 200. Additionally, in the following, in the case of distinguishing between a first vehicle (own vehicle) and a second vehicle (another vehicle), a reference number of the first vehicle will be given as 10a, and a reference number of the second vehicle as 10b. Moreover, in the communication system 1, vehicle-to-vehicle communication is performed between the first vehicle 10a and the second vehicle 10b in the case where the two vehicles are present in a predetermined communicable range.

The vehicle-to-vehicle communication between the first vehicle 10a and the second vehicle 10b and wireless communication between each vehicle 10 and the server apparatus 200 use different communication methods. For example, the vehicle-to-vehicle communication between the first vehicle 10a and the second vehicle 10b may be performed by Dedicated Short Range Communications (DSCR) or Cellular V2X (C-V2X). A communication method according to which a quantity of data that can be transmitted is greater than the vehicle-to-vehicle communication between the first vehicle 10a and the second vehicle 10b is used for the wireless communication between each vehicle 10 and the server apparatus 200. For example, the wireless communication between each vehicle 10 and the server apparatus 200 may be performed by cellular communication.

The vehicle 10 includes an electric central unit (ECU) 100, a first communication apparatus 11, and a second communication apparatus 12. The first communication apparatus 11 is a communication apparatus that is used to perform the vehicle-to-vehicle communication. The second communication apparatus 12 is a communication apparatus that is used to perform communication with the server apparatus 200.

The ECU 100 is a computer that is mounted on the vehicle 10. The ECU 100 includes a processor 101, a main storage unit 102, an auxiliary storage unit 103, and an in-vehicle communication interface (in-vehicle communication I/F) 104.

The processor 101 is a central processing unit (CPU) or a digital signal processor (DSP), for example. The main storage unit 102 is a random access memory (RAM), for example. The auxiliary storage unit 103 is a read only memory (ROM), a hard disk drive (HDD), or a flash memory, for example. The auxiliary storage unit 103 may also include a removable medium (removable recording medium). The removable medium here is a USB memory, an SD card, or a disk recording medium such as CD-ROM, a DVD disc, or a Blu-ray disc, for example.

The in-vehicle communication I/F 104 is an interface used by the ECU 100 to perform communication with another apparatus provided in the vehicle 10 using a predetermined in-vehicle communication standard. The predetermined in-vehicle communication standard may be a controller area network (CAN) or a local interconnect network (LIN), for example. The ECU 100 performs communication with the first communication apparatus 11 and the second communication apparatus 12 via the in-vehicle communication I/F 104. The ECU 100 is capable of acquiring, via the in-vehicle communication I/F 104, information that is received by the first communication apparatus 11 from another vehicle 10 and information that is received by the second communication apparatus 12 from the server apparatus 200.

The auxiliary storage unit 103 stores an operating system (OS), various programs, various information tables, and the like. When the processor 101 loads, into the main storage unit 102, and executes the programs stored in the auxiliary storage unit 103, driving assist control and notification control described later are performed. Additionally, the ECU 100 does not necessarily have to be implemented by a single physical structure, and may instead be configured by a plurality of computers that operate in conjunction with each other. Furthermore, at least one or all of functions of the ECU 100 may be implemented by a hardware circuit such as an ASIC or an FPGA.

The vehicle 10 is a vehicle that is capable of performing the driving assist control and the notification control. The driving assist control is travel control for the vehicle 10 that is automatically performed to prevent the vehicle 10 from colliding into an obstacle (such as another vehicle, a person, an animal, or an object) present on a road where the vehicle 10 is traveling. The notification control is control of notifying a driver of the vehicle 10 of presence of an obstacle present on the road where the vehicle 10 is traveling.

Moreover, the vehicle 10 is a vehicle that is capable of acquiring target information. The target information is information about a target that is present within a predetermined detection range of the vehicle 10. The target here may be another vehicle, a person, an animal, or an object. The vehicle 10 acquires the target information by analyzing an image that is captured by an outside camera mounted on the vehicle 10 or a detection value from a target detection sensor (such as a LiDAR or a millimeter wave sensor) mounted on the vehicle 10.

Figure 2:
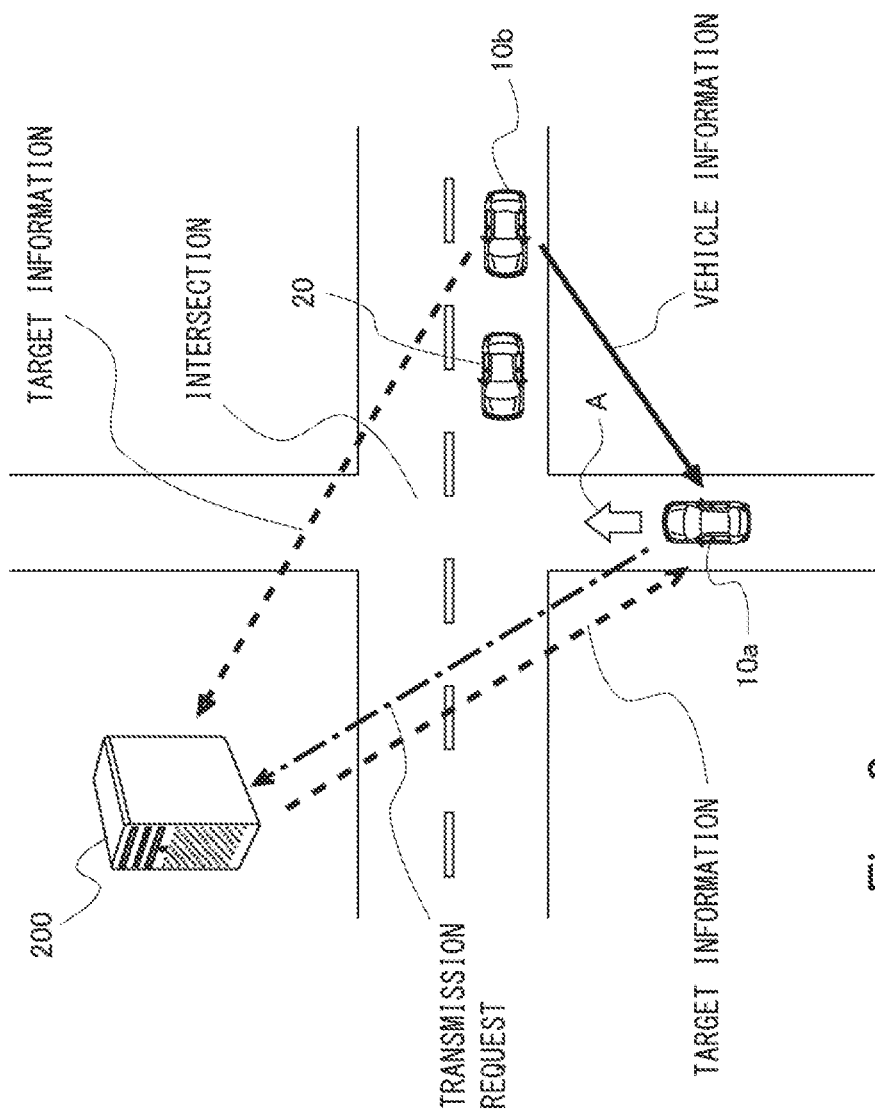
FIG. 2 is a diagram illustrating an example of a traffic state including a first vehicle and a second vehicle.

A traffic state in which the driving assist control or the notification control is performed by the first vehicle 10a will be described with reference to FIG. 2. FIG. 2 is a diagram illustrating an example of a traffic state including the first vehicle 10a and the second vehicle 10b. Additionally, in FIG. 2, a white arrow A indicates a traveling direction of the first vehicle 10a. Furthermore, in FIG. 2, a solid arrow, dashed arrows, and a dash-dotted arrow indicate transmission/reception of information.

In FIG. 2, the first vehicle 10a is about to enter an intersection. Furthermore, the second vehicle 10b is traveling toward the intersection, on a road intersecting a road where the first vehicle 10a is traveling. At this time, the first vehicle 10a and the second vehicle 10b are assumed to be in a predetermined communicable range of each other. Furthermore, a third vehicle 20 traveling toward the intersection is present in front of the second vehicle 10b. The third vehicle 20 here is a vehicle that does not include a function related to the vehicle-to-vehicle communication and a function related to wireless communication with the server apparatus 200. Here, the third vehicle 20 is assumed to be present in a predetermined detection range of the second vehicle 10b.

In the state illustrated in FIG. 2, the second vehicle 10b and the third vehicle 20 are possibly obstacles to the first vehicle 10a. At this time, as indicated by the solid arrow in FIG. 2, the first vehicle 10a receives vehicle information from the second vehicle 10b by the vehicle-to-vehicle communication. FIG. 3 is a diagram illustrating an example of a table structure of the vehicle information. As illustrated in FIG. 3, the vehicle information table includes a vehicle ID field, a position information field, and a speed information field. A vehicle ID that is identification information for identifying the second vehicle 10b is input in the vehicle ID field. Information indicating a current position of the second vehicle 10b is input in the position information field. Information indicating a speed of the second vehicle 10b is input in the speed information field. Additionally, information indicating a travel state of the second vehicle 10b, other than the position information and the speed information, may also be included in the vehicle information that is transmitted from the second vehicle 10b.

The first vehicle 10a may grasp presence of the second vehicle 10b by receiving the vehicle information from the second vehicle 10b. However, because wireless communication is not performed between the first vehicle 10a and the third vehicle 20, it is difficult for the first vehicle 10a to grasp presence of the third vehicle 20.

On the other hand, the second vehicle 10b is able to grasp the third vehicle 20 as a target. Accordingly, the second vehicle 10b is able to acquire information about traveling of the third vehicle 20 as the target information. FIG. 4 is a diagram illustrating an example of a table structure of the target information. As illustrated in FIG. 4, the target information table includes a vehicle ID field, a target position information field, and a target speed information field. The vehicle ID that is identification information for identifying the second vehicle 10b is input in the vehicle ID field. Information indicating a current position of the third vehicle 20 is input in the target position information field. Information indicating a speed of the third vehicle 20 is input in the target speed information field. Additionally, information indicating a travel state of the third vehicle 20, other than the target position information and the target speed information, may also be included in the target information that is transmitted from the second vehicle 10b. Furthermore, in the case where a plurality of targets are present within the predetermined detection range of the second vehicle 10b, the target position information and the target speed information of each target are input in the target information table. Moreover, as indicated by the dashed arrow in FIG. 2, the second vehicle 10b transmits the target information that the second vehicle 10b acquired, to the server apparatus 200.

Moreover, when the vehicle information is received from the second vehicle 10b, the first vehicle 10a transmits a transmission request to the server apparatus 200, as indicated by the dash-dotted arrow in FIG. 2. The transmission request is information requesting transmission, to the first vehicle 10a, of the target information that is received by the server apparatus 200 from the second vehicle 10b. When the transmission request is received from the first vehicle 10a, the server apparatus 200 transmits, to the first vehicle 10a, the target information received from the second vehicle 10b, as indicated by the dashed arrow in FIG. 2. Then, at the first vehicle 10a, the ECU 100 performs the driving assist control or the notification control based on the vehicle information and the target information that are received.

As described above, in the communication system 1, when the vehicle information is received by the first vehicle 10a from the second vehicle 10b by the vehicle-to-vehicle communication, the first vehicle 10a receives, through the server apparatus 200, the target information acquired by the second vehicle 10b. Accordingly, the first vehicle 10a is able to acquire the target information even in a case where quantity of the target information acquired by the second vehicle 10b is too great to be transmitted by the vehicle-to-vehicle communication. Accordingly, the first vehicle 10a may stably acquire the vehicle information about the second vehicle 10b and the target information acquired by the second vehicle 10b. As a result, various types of control may be stably performed at the first vehicle 10a by using both the vehicle information about the second vehicle 10b and the target information acquired by the second vehicle 10b.

(Information Processing)

Figure 5:
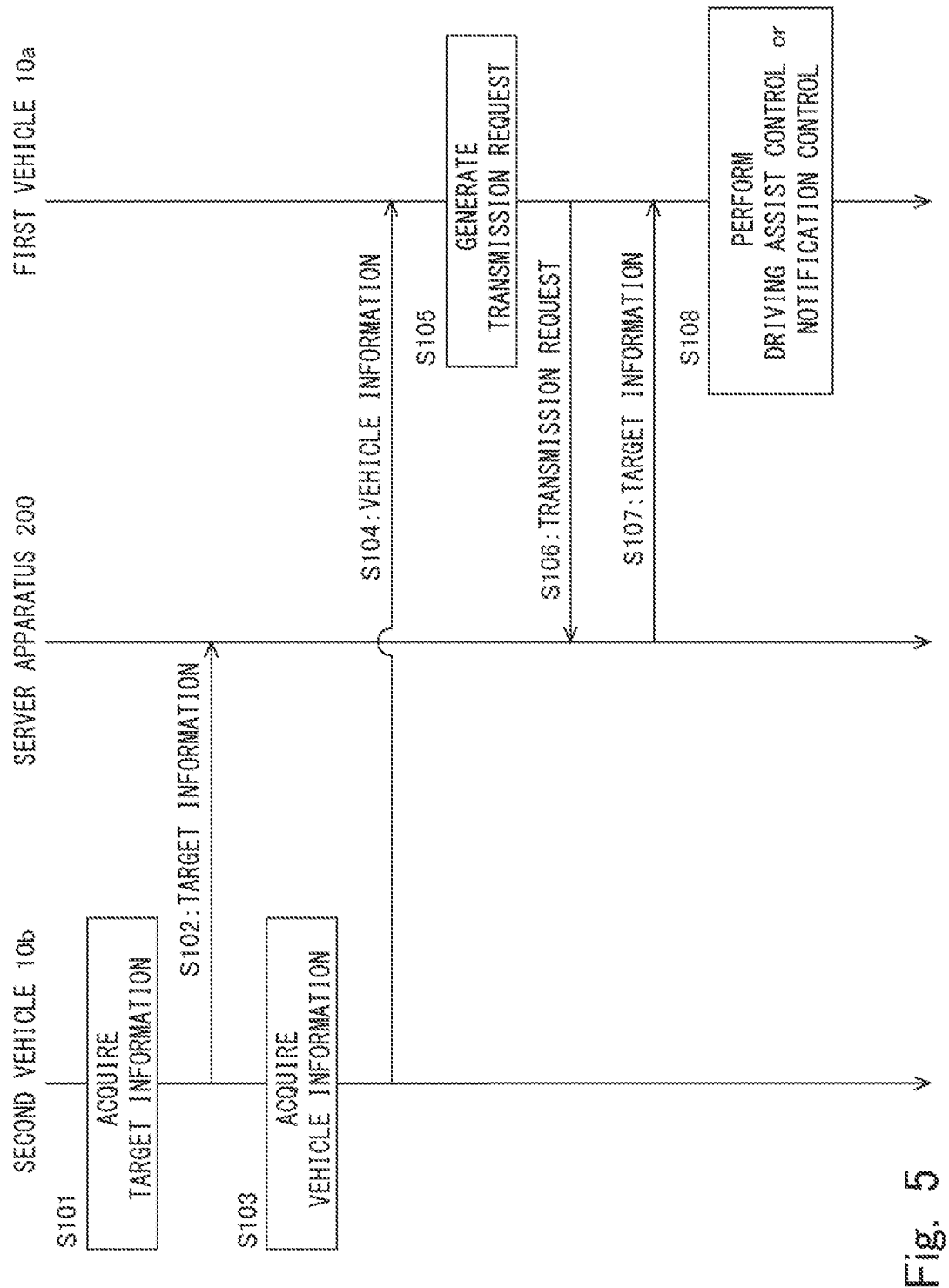
FIG. 5 is a sequence diagram illustrating a flow of information processing that is performed by the communication system.

Next, information processing that is performed by the communication system 1 according to the present embodiment will be described with reference to FIG. 5. FIG. 5 is a sequence diagram illustrating a flow of information processing that is performed by the communication system 1. Additionally, in the sequence diagram illustrated in FIG. 5, the process in each step that is performed by the first vehicle 10a is performed by the processor 101 of the ECU 100 mounted on the first vehicle 10a. Furthermore, in the sequence diagram illustrated in FIG. 5, the process in each step that is performed by the second vehicle 10b is performed by the processor 101 of the ECU 100 mounted on the second vehicle 10b. Moreover, the information processing illustrated in FIG. 5 is performed when the first vehicle 10a and the second vehicle 10b are present within a predetermined communicable range of each other.

In the present flow, first, the target information is acquired by the second vehicle 10b (S101). Here, the second vehicle 10b acquires the target information by analyzing an image captured by the outside camera mounted on the second vehicle 10b or a detection value from the target detection sensor mounted on the second vehicle 10b. Additionally, in the case where a plurality of targets are present within a predetermined detection range of the second vehicle 10b, the second vehicle 10b acquires the target information about each target. Then, the second vehicle 10b transmits the target information acquired in S101 to the server apparatus 200 (S102). At this time, transmission of the target information from the second vehicle 10b is performed through the second communication apparatus 12 of the second vehicle 10b. Furthermore, the vehicle ID of the second vehicle 10b is included in the target information that is transmitted from the second vehicle 10b to the server apparatus 200.

Furthermore, the second vehicle 10b also acquires the vehicle information about itself (S103). Here, the position information of the second vehicle 10b is acquired from a GPS receiver mounted on the second vehicle 10b. Furthermore, the speed information of the second vehicle 10b is acquired from a speed sensor mounted on the second vehicle 10b. Then, the second vehicle 10b transmits the vehicle information acquired in S103 to the first vehicle 10a by the vehicle-to-vehicle communication (S104). At this time, transmission of the vehicle information from the second vehicle 10b is performed through the first communication apparatus 11 of the second vehicle 10b. Furthermore, the vehicle ID of the second vehicle 10b is included in the vehicle information that is transmitted from the second vehicle 10b to the first vehicle 10a.

At the first vehicle 10a, the transmission request is generated when the vehicle information is received from the second vehicle 10b (S105). At this time, the transmission request is generated based on the vehicle ID of the second vehicle 10b included in the vehicle information received from the second vehicle 10b. That is, the transmission request is generated as information for requesting transmission of the target information that is received by the server apparatus 200 from the second vehicle 10b. Then, the first vehicle 10a transmits the transmission request generated in S105 to the server apparatus 200 (S106). At this time, transmission of the transmission request from the first vehicle 10a is performed through the second communication apparatus 12 of the first vehicle 10a.

When the transmission request is received from the first vehicle 10a, the server apparatus 200 transmits, to the first vehicle 10a, the target information received in S102 from the second vehicle 10b (S107). Then, at the first vehicle 10a, the driving assist control or the notification control is performed based on the vehicle information received in S104 from the second vehicle 10b and the target information received in S107 from the server apparatus 200 (S108).

At this time, the processor 101 of the ECU 100 mounted on the first vehicle 10a determines whether there is a possibility of the first vehicle 10a colliding into the second vehicle 10b, based on the vehicle information of the second vehicle 10b. Furthermore, the processor 101 of the ECU 100 mounted on the first vehicle 10a determines whether there is a possibility of the first vehicle 10a colliding into a target corresponding to the target information, based on the target information. Then, in the case where it is determined that there is a possibility of the first vehicle 10a colliding into the second vehicle 10b or a target corresponding to the target information, the driving assist control or the notification control is performed.

First Modification

In the following, a first modification of the present embodiment will be described. The quantity of the target information that is acquired by the second vehicle 10b is different depending on a state surrounding the second vehicle 10b. That is, the quantity of the target information that is acquired by the second vehicle 10b is increased as the number of targets present within the predetermined detection range of the second vehicle 10b is increased. In other words, the quantity of the target information that is acquired by the second vehicle 10b is small when the number of targets present within the predetermined detection range of the second vehicle 10b is small. Accordingly, depending on the state surrounding the second vehicle 10b, the quantity of the target information that is acquired by the second vehicle 10b may be such that transmission to the first vehicle 10a by the vehicle-to-vehicle communication is possible. Accordingly, in the present modification, a transmission destination of the target information from the second vehicle 10b is selected based on the quantity of the target information that is acquired by the second vehicle 10b.

Figure 6:
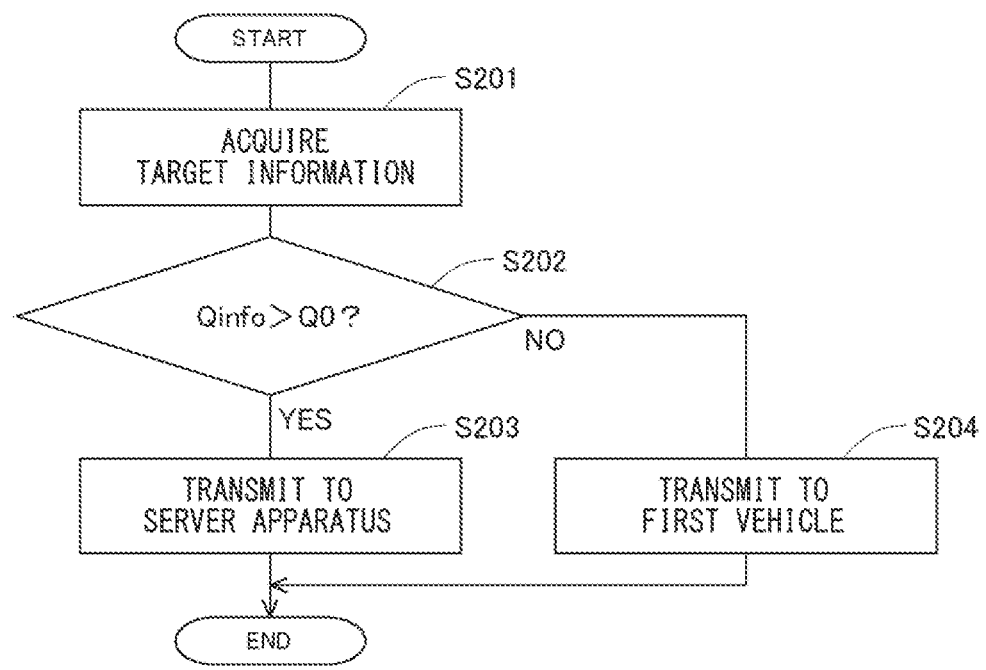
FIG. 6 is a flowchart illustrating a flow of information processing that is performed by an ECU mounted on the second vehicle.

Information processing according to the present modification that is performed by the ECU 100 mounted on the second vehicle 10b will be described with reference to FIG. 6. FIG. 6 is a flowchart illustrating a flow of information processing that is performed by the ECU 100 mounted on the second vehicle 10b. The present flow is performed by the processor 101 of the ECU 100 mounted on the second vehicle 10b.

In the present flow, first, the target information is acquired in S201 (the process in the present step is the same as the process in S101 in the sequence diagram illustrated in FIG. 5). Next, in S202, whether a quantity Qinfo of the target information acquired in S201 is greater than a predetermined quantity Q0 or not is determined. The predetermined quantity Q0 here is a quantity that is determined in advance and that is equal to or smaller than an upper limit of a data quantity that can be transmitted/received by the vehicle-to-vehicle communication.

In the case where positive determination is made in S202, the target information is transmitted next to the server apparatus in S203 (the process in the present step is the same as the process in S102 in the sequence diagram illustrated in FIG. 5). By contrast, in the case where negative determination is made in S202, the target information is transmitted next to the first vehicle 10a by the vehicle-to-vehicle communication in S204. At this time, transmission of the target information from the second vehicle 10b is performed through the first communication apparatus 11 of the second vehicle 10b.

According to the present modification, in the case where the quantity of the target information that is acquired by the second vehicle 10b is sufficiently small, the target information can be directly transmitted from the second vehicle 10b to the first vehicle 10a.

Other Modifications

In the embodiment described above, the first vehicle 10a transmits the transmission request to the server apparatus 200 in order to receive, from the server apparatus 200, the target information that is transmitted from the second vehicle 10b to the server apparatus 200. However, the first vehicle 10a may also receive the target information from the server apparatus 200 without transmitting the transmission request.

For example, each of the first vehicle 10a and the second vehicle 10b may transmit the vehicle information about itself to the server apparatus 200. In this case, the server apparatus 200 is able to acquire the position information of each of the first vehicle 10a and the second vehicle 10b. Then, the server apparatus 200 may grasp that the first vehicle 10a and the second vehicle 10b are present within the predetermined communicable range of each other, based on the current position of each of the first vehicle 10a and the second vehicle 10b. At this time, the server apparatus 200 may specify the first vehicle 10a as the transmission destination of the target information received from the second vehicle 10b. The first vehicle 10a may thus receive the target information from the server apparatus 200 without transmitting the transmission request.

Furthermore, there may also be a case where there is no other vehicle, person, animal, or object that may possibly be a target in the surroundings of the second vehicle 10b. In this case, the second vehicle 10b is not able to acquire the target information. Accordingly, the server apparatus 200 does not receive the target information from the second vehicle 10b. At such a time, even when the first vehicle 10a receives the vehicle information from the second vehicle 10b, the first vehicle 10a does not have to transmit the transmission request to the server apparatus 200.

Accordingly, in the case where the second vehicle 10b acquires the target information, and transmits the target information to the server apparatus 200, the vehicle information that is transmitted from the second vehicle 10b to the first vehicle 10a may include predetermined information indicating that the second vehicle 10b transmitted the target information to the server apparatus 200. In the case where the predetermined information is included in the vehicle information received from the second vehicle 10b, the first vehicle 10a transmits the transmission request to the server apparatus 200. In other words, in the case where the vehicle information received from the second vehicle 10b does not include the predetermined information, the first vehicle 10a does not transmit the transmission request to the server apparatus 200. Accordingly, it is possible to prevent transmission of an unnecessary transmission request from the first vehicle 10a to the server apparatus 200 when the first vehicle 10a receives the vehicle information from the second vehicle 10b.

OTHER EMBODIMENTS

The embodiments described above are merely examples, and the present disclosure may be changed and implemented as appropriate within the scope of the disclosure. Furthermore, processes and elements described in the present disclosure may be freely combined to the extent that no technical conflict exists.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROMs), random access memories (RAMs), EPROMS, EEPROMs, magnetic cards, flash memories, or optical cards.

What is claimed is:

1. An information processing apparatus mounted on a first vehicle, the information processing apparatus comprising a controller configured to:
   receive vehicle information including information about a travel state of a second vehicle, from the second vehicle by vehicle-to-vehicle communication;
   transmit, to a server apparatus, a transmission request for target information that is received by the server apparatus from the second vehicle, when the vehicle information is received from the second vehicle; and
   receive from the server apparatus, the target information that is transmitted by the second vehicle to the server apparatus.

2. The information processing apparatus according to claim 1, wherein, in a case where the vehicle information received from the second vehicle includes information indicating that the target information is transmitted by the second vehicle to the server apparatus, the controller transmits the transmission request to the server apparatus.

3. The information processing apparatus according to claim 1, wherein
   the vehicle information includes identification information for identifying the second vehicle, and
   the controller generates the transmission request based on the identification information.

4. The information processing apparatus according to claim 1, wherein the vehicle information includes, as the information about the travel state of the second vehicle, at least position information of the second vehicle and speed information of the second vehicle.

5. The information processing apparatus according to claim 1, wherein the target information includes at least position information of a target that is present within a predetermined detection range of the second vehicle and speed information of the target.

6. A vehicle configured to:
   receive vehicle information including information about a travel state of another vehicle, from another vehicle by vehicle-to-vehicle communication;
   transmit to a server apparatus, a transmission request for the target information that is received by the server apparatus from the another vehicle, when the vehicle information is received from the another vehicle; and
   receive from the server apparatus, the target information that is transmitted by the another vehicle to the server apparatus.

7. The vehicle according to claim 6, wherein, in a case where the vehicle information received from another vehicle includes information indicating that the target information is transmitted by another vehicle to the server apparatus, the vehicle transmits the transmission request to the server apparatus.

8. The vehicle according to claim 6, wherein
the vehicle information includes identification information for identifying another vehicle, and
the transmission request is generated based on the identification information.

9. The vehicle according to claim 6, wherein the vehicle information includes, as the information about the travel state of another vehicle, at least position information of another vehicle and speed information of another vehicle.

10. The vehicle according to claim 6, wherein the target information includes at least position information of a target that is present within a predetermined detection range of another vehicle and speed information of the target.

11. A system comprising a first vehicle, a second vehicle, and a server apparatus; wherein:
the second vehicle transmits vehicle information including information about a travel state of the second vehicle, to the first vehicle by vehicle-to-vehicle communication;
the second vehicle transmits target information acquired by the second vehicle, to the server apparatus;
the first vehicle transmits a transmission request for the target information to the server apparatus, when the vehicle information is transmitted by the second vehicle to the first vehicle and when the first vehicle receives the vehicle information from the second vehicle; and
the server apparatus transmits the target information received from the second vehicle to the first vehicle, when the server apparatus receives the transmission request from the first vehicle.

12. The system according to claim 11, wherein, in a case where the vehicle information received from the second vehicle includes information indicating that the target information is transmitted by the second vehicle to the server apparatus, the first vehicle transmits the transmission request to the server apparatus.

* * * * *